May 20, 1969   B. J. GALLAGHER ET AL   3,445,088
SAMPLE CYLINDER VALVE
Filed Jan. 19, 1967
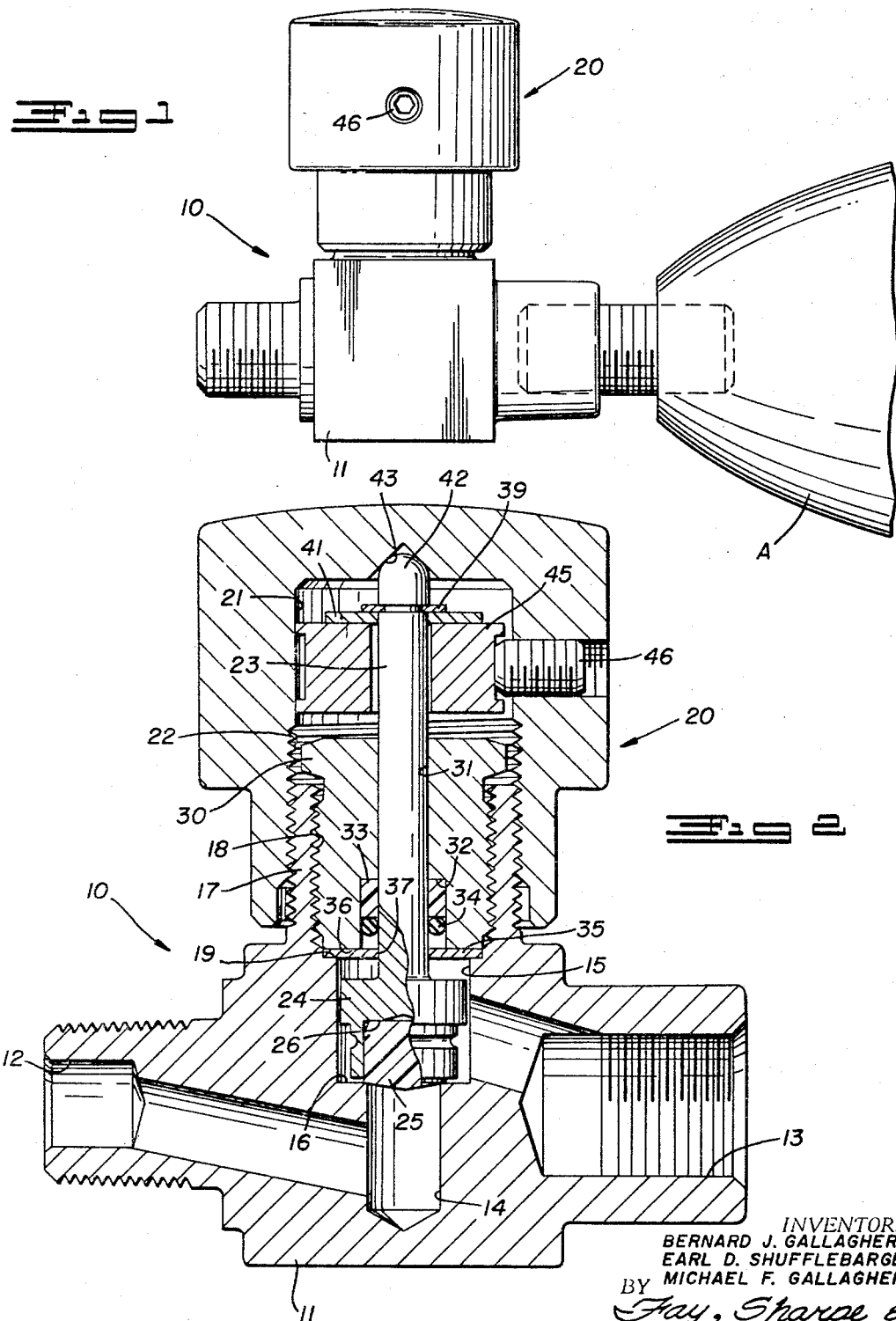
INVENTORS
BERNARD J. GALLAGHER,
EARL D. SHUFFLEBARGER &
MICHAEL F. GALLAGHER
BY Fay, Sharpe & Mulholland
ATTORNEYS

3,445,088
SAMPLE CYLINDER VALVE
Bernard J. Gallagher, Cleveland Heights, Earl D. Shufflebarger, Bedford, and Michael F. Gallagher, Cleveland Heights, Ohio, assignors to Whitey Research Tool Co., Emeryville, Calif., a corporation of California
Filed Jan. 19, 1967, Ser. No. 610,432
Int. Cl. F16k 31/528, 1/04
U.S. Cl. 251—214                  5 Claims

ABSTRACT OF THE DISCLOSURE

A valve having an externally threaded bonnet over which a handle is threaded with a stem extending upwardly of the bonnet into a chamber in the handle. The upper end of the stem is dome shaped and engages a conical recess in the end wall of the chamber in the handle with a bushing rotatably received over the end of the stem and a set screw connecting the handle to the bushing. The clearance between the outer diameter of the bushing and the inner diameter of the chamber is less than the clearance between the inner diameter of the bushing and the outer diameter of the stem to prevent cocking of the stem.

Summary of the invention

This invention relates to a valve adapted for use with a sample cylinder.

Sample cylinders are used to store a sample of gas or fluid for a diversity of purposes such as analysis by gas chromatography or other analytical methods. These cylinders are used to store the gas prior to the time when the analysis is to be made. After cylinders of the type herein contemplated have been used, they frequently are dropped, tossed about or otherwise abused. The immediate result is that the conventional valve ordinarily used in association with such cylinders is either broken and must be replaced or no longer is operable to seal the cylinder.

The principal weak points on the conventional valve are the handle, which is plastic and can easily be broken, and the stem which protrudes out of the valve and is easily bent. Also the conventional valve is too large for ordinary service with a sample cylinder.

Another type of use of a sample cylinder gives rise to another problem in the valve associated therewith. Thus, it frequently occurs that a sample of gas will be stored in the cylinder under pressures in the vicinity of 3,000 p.s.i. Samples of this gas may be withdrawn periodically so that the valve and its associated seals are under extremely high pressures over a prolonged period of time. In such circumstances, the seals provided by the valve must be adequate to withstand these pressures, yet the operation of the valve under these extreme pressures must be as easy as possible.

Accordingly, it is an object of this invention to provide a valve which is small, compact and highly resistant to abuse.

A further object of this invention is to provide a valve adapted to be used with a sample cylinder which includes a fully protected stem.

A more specific object of the invention is to provide a valve having an externally threaded bonnet over which a handle is threaded. A stem extends upwardly of the bonnet into a chamber in the handle. The upper end of the stem is dome shaped and engages a conical recess in the end wall of the chamber in the handle. A bushing is rotatably received over the end of the stem with a set screw connecting the handle to the bushing. The clearance between the outer diameter of the bushing and the inner diameter of the chamber is less than the clearance between the inner diameter of the bushing and the outer diameter of the stem.

In the drawings wherein like reference numerals indicate like parts in the various views:

FIG. 1 is a side elevation view showing the valve as it is attached to a sample cylinder.

FIG. 2 is an enlarged side elevation view in section showing the relationship of the parts comprising the instant invention.

Referring first to FIG. 2, there is illustrated the valve, indicated generally by the reference numeral 10, which comprises the instant invention. This valve has a valve body 11 with coaxially aligned bores 12 and 13. These bores are interconnected by a crossbore 14. A counterbore 15 coaxial with the crossbore 14 and opening upwardly of the valve body 11 defines a valve chamber. The transverse shoulder 16 at the juncture of the crossbore 14 and the counterbore 15 defines a valve seat.

The valve body 11 has a bonnet portion 17 which is counterbored and threaded at 18 coaxial with the crossbore 14 and the counterbore 15. A transverse shoulder 19 is formed at the juncture of the two counterbores 15 and 18.

Threadedly received over the bonnet 17 is a handle or cap 20. The handle includes a central chamber 21 with threads 22 on a portion of the walls of that chamber and being in cooperation with threads on the exterior of the bonnet 17. Disposed in the chamber 21 is a valve stem 23. The stem has an enlarged end portion 24 thereof disposed in and closely fitting with the walls of the valve chamber 15. This end 24 of the stem 23 is enlarged in diameter to minimize the dead space in the valve when the valve is closed provide guiding for the lower end of the stem. A seat 25 is secured in the end 24 of the stem 23. This seat 25 is received in a recess 26 formed in the end of the stem. The seat 25 is normally made of a soft material preferably either Kel-F or glass filled Teflon, and is of substantially blunt shape so that a minimum amount of longitudinal travel of the stem 23 is required to place the stem in a full open position.

To provide a guiding and sealing arrangement for the stem 23 a packing gland nut 30 is threadedly received in the counterbore 18. The gland nut includes an aperture 31 in the upper end thereof through which the stem 23 protrudes. A counterbore 32 is formed in the packing nut coaxial with the aperture 31. A guide bushing or spacer 33 is disposed in the counterbore 32 surrounding a portion of the stem 23. Also received in the counterbore 32 and encircling the stem 23 is an O-ring 34 which is contiguous to the gland 33.

Retention of the spacer and the O-ring in the counterbore 32 is accomplished by a washer gasket 35. This gasket is interposed between the end 36 of the packing nut 30 and the transverse shoulder 19 with a central aperture 37 in the gasket 35 permitting the stem 23 to pass therethrough. It is apparent that the combination of the washer 35 and the gland 33 provides a groove for the O-ring. Moreover, the washer provides a seal at the shoulder 19, thereby isolating the threaded connection 18 from the fluid in the system.

As indicated above, it is desired relatively to isolate the stem 23 from the handle 20 so that any impacts on the handle will not be directly transmitted to the stem. This is accomplished by attaching to the upper end of the stem 23 a snap ring retaining washer 39 received in a groove in the stem. A thrust washer 41 is received over the end of the stem 23 between the snap ring 39 and the upper surface of a bushing 45. The bushing is rotatable on the tsem 23 with the clearance between the outer diameter of the bushing 45 and the inner diameter of the chamber 21 being less than the clearance between the inner diameter of the bushing 45 and the outer diameter of the stem 23. The inner diameter of the washer 41 is very close to the outer diameter of the stem 23. A set screw 46 interconnects the handle with the bushing 45. The upper end of the stem 23 includes a domed portion 42 received in a conical recess 43 formed in the end wall of the chamber 21.

The operation of the valve is as follows: One end of the valve 10 may be threadedly received in a sample cylinder A, a portion of which is shown in FIG. 1. The other end of the valve may be connected to a source of gas whereby the cylinder A may be filled. To actuate the valve to permit introduction of the gas in the cylinder the handle 20 is rotated which causes axial movement of the handle on the threads on the bonnet 17. The rotating movement of the handle 20 is not transmitted to the stem 23. As the handle 20 is axially displaced, the bushing 45 which is secured to the handle 20 by the set screws 46 is also displaced along the stem 23 and engages the thrust washer 41. The thrust washer 41 in turn engages the snap ring 39 secured to the handle of the stem 23 thereby displacing the stem. Axial displacement of the stem 23 displaces the seat 25 from the valve seat 16 permitting the introduction of gas into the cylinder A. Reverse rotation of the handle 20 will, of course, cause the handle to be threaded axially on the bonnet 17. In such circumstances, the conical recess 43 in the handle 20 abuts the upper end 42 of the stem and imports a longitudinal, nonrotating movement to the stem 23 thereby engaging the seat 25 with the valve seat 16.

If a large number of samples are being taken, it is readily understood that considerable abuse might be imparted to the valve 10. By the design herein disclosed wherein the stem 23 is substantially protected by the handle and relatively isolated from the impacts imparted to the handle, the operating life of the valve is greatly enhanced. Any abuse sustained by the handle is absorbed through the threaded connections 22 by the valve body and not the stem. Moreover, because of the relatively close fit between the outer diameter of the bushing 45 and the inner diameter of the chamber as compared to the inner diameter of the bushing and the outer diameter of the stem, any tendency of cocking the stem either through impacts to the handle or through tightening of the set screws 46 is obviated.

We claim:
1. A valve comprising:
  a body having a fluid passage therethrough including inlet and outlet ports,
  a valve chamber communicating with said inlet and outlet ports in said body and including a valve seat,
  a bonnet portion on said body,
  a handle threadedly received over said bonnet portion, said handle including a central chamber therein enclosing said bonnet portion,
  a valve stem disposed in said central chamber and extending through said bonnet into said valve chamber,
  the lower end of said stem including a tip adapted to engage the valve seat in said valve chamber,
  the upper end of said stem including retaining means,
  a cylindrical bushing received over said stem and being retained thereon by the retaining means,
  said bushing being rotatable on said handle for longitudinal movement therewith whereby movement of said handle causes engagement of said bushing with said retaining means thereby to impart a corresponding longitudinal movement to said stem to displace the tip of said stem from said valve seat in said valve chamber,
  the clearance between the outer diameter of said bushing and the diameter of said central chamber being less than the clearance between the inner diameter of said bushing and the outer diameter of said stem.

2. The valve of claim 1 wherein said bonnet portion includes:
  a counterbore coaxial with said valve chamber and including a transverse shoulder at the juncture of said valve chamber and said counterbore,
  a packing nut threadedly engaged in the counterbore of said bonnet portion,
  said packing nut including an aperture through which said valve stem projects and a counterbore portion coaxial with said aperture,
  a cylindrical packing gland received in said counterbore portion of said packing nut and surrounding a portion of said stem,
  an O-ring surrounding a portion of said stem and disposed in said counterbore portion of said packing nut, and
  a ring gasket received over said stem and clamped between the end of said packing nut and said shoulder,
  said gasket and said packing gland cooperating to define a groove in which said O-ring is disposed.

3. The combination of claim 1 wherein the upper end of said stem and the end wall of said central chamber have a conical recess formed in one of them and dome defining means carried by the other of them with said dome defining means being received in said recess.

4. The combination of claim 2 wherein the upper end of said stem and the end wall of said central chamber have a conical recess formed in one of them and dome defining means carried by the other of them with said dome defining means being received in said recess.

5. The valve of claim 1 wherein the retaining means includes a thrust washer sandwiched between the bushing and a snap ring, the ring being secured in a groove in the stem.

References Cited

UNITED STATES PATENTS

| | | | |
|---|---|---|---|
| 2,617,621 | 11/1952 | Hobbs | 251—273 |
| 2,658,716 | 11/1953 | Winfree | 251—273 |
| 3,305,207 | 2/1967 | Calderoni et al. | 251—214 X |
| 3,356,335 | 12/1967 | Koch et al. | 251—214 |

WILLIAM S. BURDEN, *Primary Examiner.*